F. A. HOWARD, C. I. ROBINSON, AND J. M. JENNINGS.
PREVENTION OF EVAPORATION OF STORED LIQUIDS.
APPLICATION FILED APR. 12, 1920.
1,415,351.   Patented May 9, 1922.
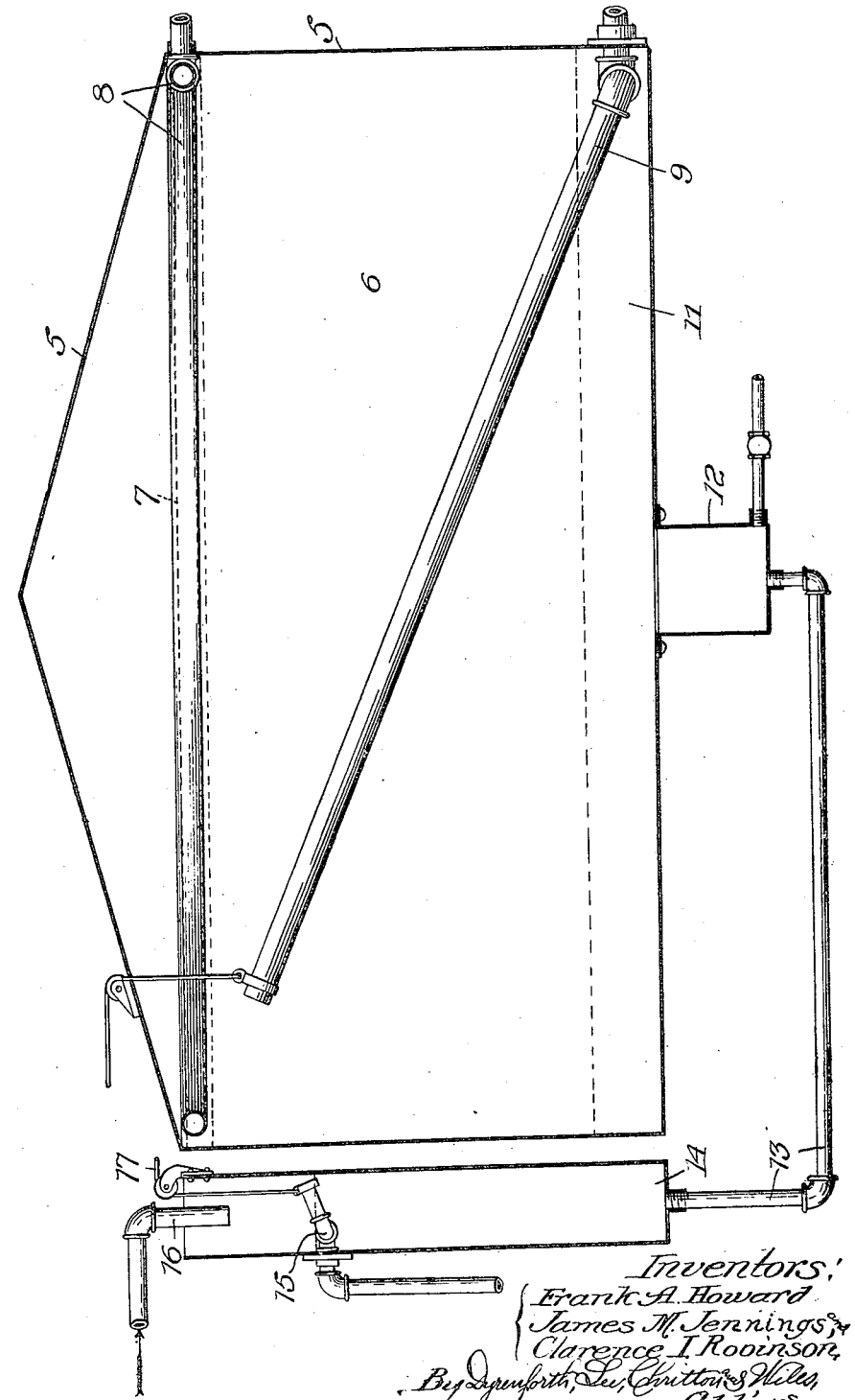

UNITED STATES PATENT OFFICE.

FRANK A. HOWARD AND CLARENCE I. ROBINSON, OF WESTFIELD, AND JAMES M. JENNINGS, OF ELIZABETH, NEW JERSEY, ASSIGNORS TO STANDARD OIL COMPANY, OF BAYONNE, NEW JERSEY, A CORPORATION OF NEW JERSEY.

PREVENTION OF EVAPORATION OF STORED LIQUIDS.

1,415,351.

Specification of Letters Patent.    Patented May 9, 1922.

Application filed April 12, 1920. Serial No. 373,454.

*To all whom it may concern:*

Be it known that we, FRANK A. HOWARD, CLARENCE I. ROBINSON, and JAMES M. JENNINGS, citizens of the United States, residing at Westfield, New Jersey, and Elizabeth, New Jersey, in the county of Union and State of New Jersey, have invented a new and useful Improvement in the Prevention of Evaporation of Stored Liquids, of which the following is a specification.

The present invention relates to the storage of volatile liquids and more particularly to means for preventing the evaporation thereof. It is particularly directed to the prevention of evaportion of petroleum oils and similar volatile liquids immiscible with water held in vented storage tanks for considerable periods of time. The invention will be clearly understood from the following specification, in which a mode of carrying it into effect is described and illustrated in the accompanying drawings.

In the drawings the figure illustrates, by a sectional view, an ordinary vented storage tank provided with means for carrying out the present invention.

In the storage of large quantities of volatile liquids such as crude petroleum, material losses are caused by evaporation from the liquid, and by the so-called "breathing" effect due to the expansion and contraction of the air in the clearance or "outage" of the tank with changes in temperature of the surrounding atmosphere, for example, from day to night. It will be readily perceived that in large storage tanks, having a diameter of 90 to 100 feet and containing as much as two million gallons of the volatile liquid, any loss by evaporation, even though slight as compared to the total amount of liquid in the tank, is of very considerable economic importance.

In accordance with the present invention, evaporation from the surface of the liquid is to a great extent, or almost completely, prevented by maintaining upon the surface of the liquid a covering blanket of a froth or foam, the gaseous constituent of which may be air or an inert gas, such as carbon dioxide. At the same time the fire hazard is greatly reduced. This foam or froth has as its base, preferably, a liquid immiscible in the stored liquid, and of such composition as to congeal or solidify into a substantially permanent or stable foam or froth, at ordinary atmospheric temperatures. A suitable liquid for the formation of such a froth may be obtained by dissolving in water a sufficient quantity (approximately 8 per cent, for example) of commercial animal gelatin, and, if desired, a very small percentage (0.1 per cent for example) of a soluble preservation agent, such as mercuric chloride. If the gelatine is difficult to beat into a foam, a small amount of any ordinary foaming agent such as extract of soap bark may be added. It has likewise been found desirable to add to the foam-forming liquid a suitable quantity, for example, ten per cent of glycerin, which appears to considerably increase the stability or permanency of the foam, render it tougher, prevent drying out of its surface, and lower its freezing point.

Referring more particularly to the drawings, the numeral 5 indicates a suitable storage tank, in which is stored a relatively large quantity of crude oil, indicated by the numeral 6. A surface covering or layer of foam, indicated by the numeral 7, is maintained upon the surface of the oil to a substantially uniform depth, for example, one to six inches, and is continuous over the entire surface of the liquid. This layer of foam is stable or permanent in character and has as its base a foam forming liquid of the character described; for example, an aqueous solution containing approximately 10 per cent of glycerin, 8 per cent of gelatin, and 0.1 per cent of a preservative, such as mercuric chloride.

The foam forming liquid may be supplied to the surface of the oil in the tank through the perforated annular distributing pipe 8, somewhat above the level of the oil therein. Oil is withdrawn from the tank through the customary outlet pipe 9 and the tank may likewise be supplied with oil through the same.

The foam or froth which is supplied to the pipe 9 is preferably of a very fine-grained character, having the contained air or other gas in very finely dispersed state. Such a foam may be produced, for example, as described in the copending application of one of us with another, Serial No. 373455 filed April 12th, 1920, in accordance with which a foam or froth is initially produced by blowing small air bubbles or gas bubbles through the liquid, thereby producing a coarse froth or foam, which is subsequently subjected to a rapid and repeated mechanical beating and breaking action to convert it into a fine-grained froth. In order to produce a froth of the character described herein, the liquid base is preferably maintained at a slightly elevated temperature, for example, 90 degrees F., at which the froth produced is capable of flowing with a fair degree of freedom. At such a temperature it is discharged upon the surface of the gasoline contained in the tank, and within a short time congeals or solidifies to form a stable or permanent gelled foam. With a liquid base of the character described, this foam will have somewhat the appearance or character of sponge rubber, although, of course, of less tenacity and resiliency. Exposure to air or to petroleum oils or their vapors for considerable periods does not impair the properties of the foam, nor do ordinary atmospheric changes of temperature. It may be readily melted by a moderate heat, and if not heated too high or held in melted state the dispersed gas is not released. It may hence be readily patched or breaks may be sealed by re-melting, for example, by means of a steam-jet, or by flowing fresh foam, in the warm or liquid state, over the part to be patched, which is fused and welded with the freshly applied foam. Freezing of the foam is to be avoided, as it tends to destroy the imperviousness of the foam and permit it to become saturated with the liquid on which it floats.

In order to prevent any impairment of the seal provided by the froth or foam, means may be provided to maintain the gasoline within the tank at approximately a constant level. As illustrated in the drawings, water may be admitted into the bottom of the tank, as indicated by the numeral 11, a well or drain being provided, for example, at about the center of the tank. This well may communicate through a pipe 13 with the bottom of a suitable standpipe 14, which is provided with an adjustable overflow 15 and an inlet 16 through which water is constantly supplied. The overflow may suitably be formed as a swing pipe provided with a cable 16 for its adjustment from without the stand pipe. The position of the overflow pipe 15 is so adjusted as to maintain a column of water within the stand pipe 14 which will balance the liquid within the tank and maintain the surface level of the gasoline therein at a substantially constant point. On removal of gasoline from within the tank, the constant supply of water through the pipe 16 into the stand pipe 14 causes the gasoline withdrawn to be replaced by water, and the position of the overflow pipe 15 may be raised to compensate for the greater density of the water thus supplied.

When the tank is filled with gasoline, the reverse action takes place, the water displaced in the tank being discharged through the overflow, which is lowered to compensate for the decreased density of the liquid in the tank.

Although the present invention has been described in connection with certain specific details of a process and apparatus for carrying it into effect, it is not intended that these details shall be regarded as limitations upon the scope of the invention, except in so far as included in the accompanying claims.

What we claim as new and desire to secure by Letters Patent is:

1. The method of preventing the evaporation of liquids confined in a vented storage container, which consists in maintaining on the surface of the liquid a layer of permanent foam.

2. The method of preventing the evaporation of liquids confined in vented storage containers which consists in maintaining on the surface of the liquid a layer of permanent foam having as its base a liquid insoluble in the stored liquid.

3. The method of preventing the evaporation of oils confined in a vented storage container, which consists in maintaining upon the surface of the oil a layer of permanent foam having as its base an aqueous gelatin solution.

4. The method of preventing the evaporation of liquids confined in suitable storage containers which consists in maintaining upon the surface of the liquid a layer of permanent foam, and maintaining the surface of the liquid at a substantially constant level.

5. The method of preventing the evaporation of liquids confined in storage containers which consists in maintaining upon the surface of the liquid a layer of permanent foam, and balancing a column of another liquid immiscible with the stored liquid against the latter to maintain a substantially constant level thereof.

6. The method of preventing the evaporation of gasoline confined in a suitable storage container which consists in maintaining upon the gasoline a layer of a permanent foam, maintaining a column of water in liquid communication with the gasoline in the tank at the bottom of the latter and varying the height of said column to maintain a substantially constant level of the gasoline.

7. The method of sealing exposed surfaces of petroleum oils or the like which consists in applying thereto a gelatinizable froth in liquid state and permitting it to congeal in situ.

8. The method of sealing exposed surfaces of petroleum oils or the like which consists in flowing thereupon a gelatinizable aqueous liquid having a gas dispersed therein to produce a froth capable of floating on the oil and congealing the froth in situ.

9. The combination with a storage tank for gasoline and similar materials, of means for supplying a foam to the surface of the stored liquid and means for maintaining the surface of the stored liquid at a substantially constant level beneath the foam.

10. In combination, a storage tank adapted to contain a liquid, means for supplying a foam to the surface of the liquid, a stand pipe communicating with the bottom of the tank, means for constantly supplying water to the stand pipe, an overflow for the water in said stand pipe and means for adjusting the position of said overflow to vary the level of the water in the stand pipe and thereby maintain the surface of the liquid in the storage tank at a substantially constant level.

11. In combination, a storage tank adapted to contain a liquid, means for supplying a foam to the surface of the liquid, means for hydrostatically balancing a column of liquid against the liquid in the storage tank and means for varying the height of the column of said balancing column of liquid to maintain the surface of the stored liquid at a substantially constant level.

12. A foam forming liquid containing water with approximately 8% of gelatin, 10% of glycerin and a preservative.

13. A foam forming liquid comprising water, gelatin in quantity to form a gel, and glycerin.

14. A storage container for a volatile liquid and a solidified foam or froth therein blanketing the volatile liquid, and floated thereupon.

15. A storage container for a volatile liquid and a solidified foam or froth therein blanketing the volatile liquid, said froth consisting of minute gas bubbles dispersed through an aqueous solution of a gel-forming colloid in gelling proportions.

FRANK A. HOWARD.
CLARENCE I. ROBINSON.
JAMES M. JENNINGS.